Nov. 25, 1969  W. M. SHOFFNER  3,480,114
MERCHANDISE CHECK OUT SYSTEM
Filed Aug. 11, 1967  3 Sheets-Sheet 1
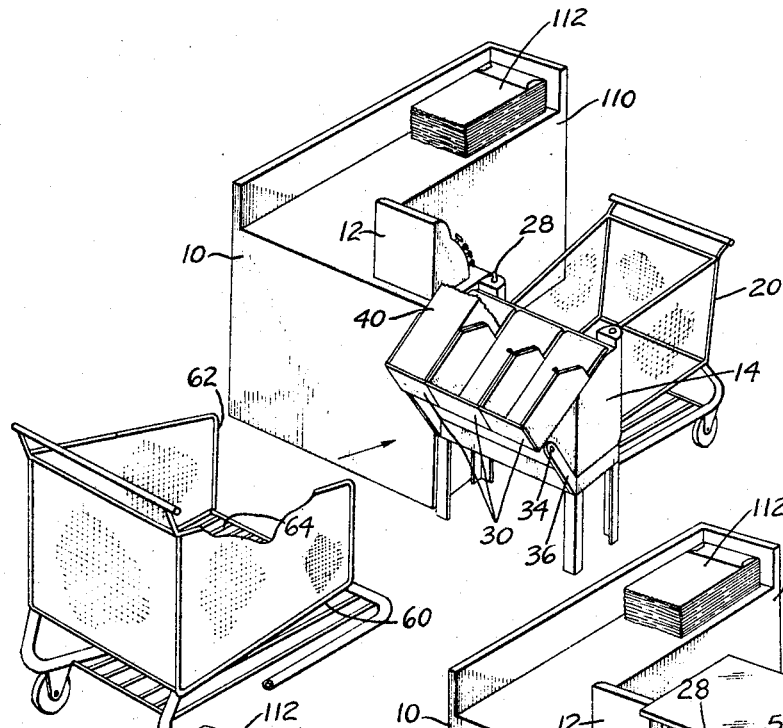
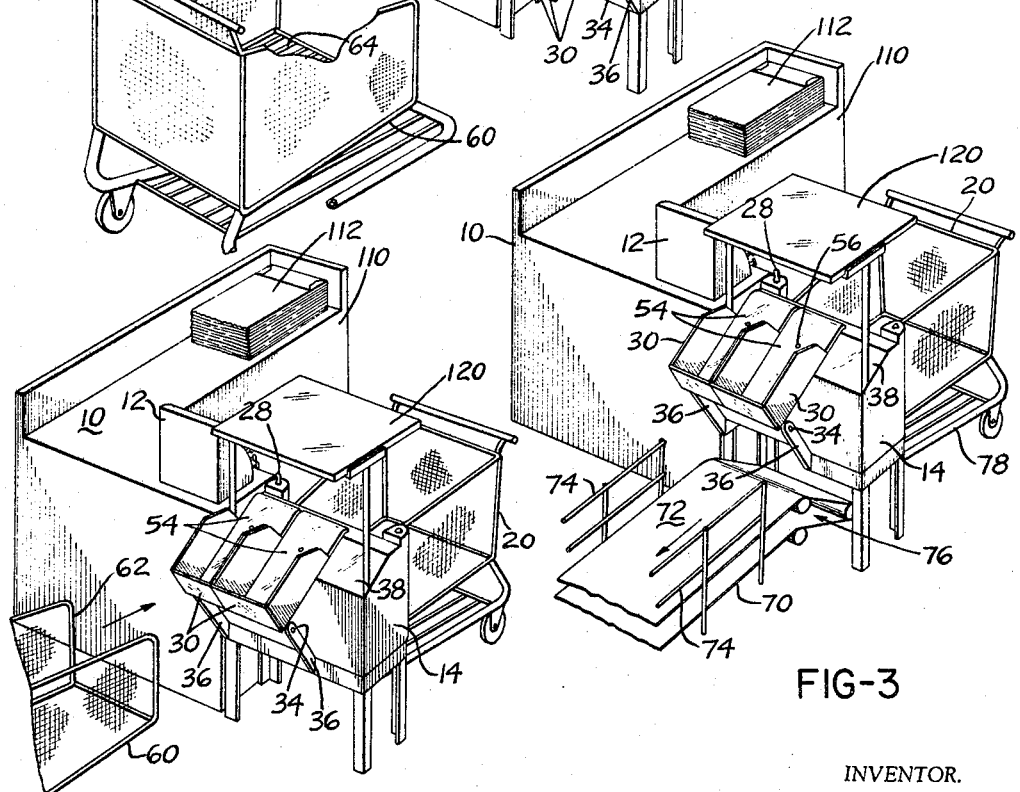
INVENTOR.
WILLIE M. SHOFFNER
BY
Melvin A. Crosby

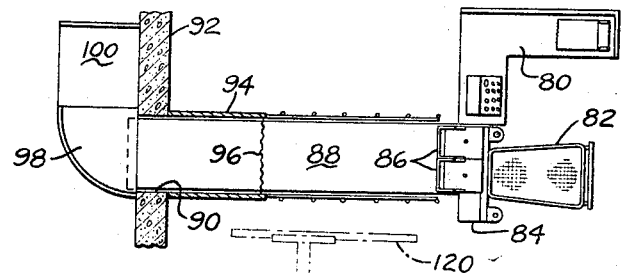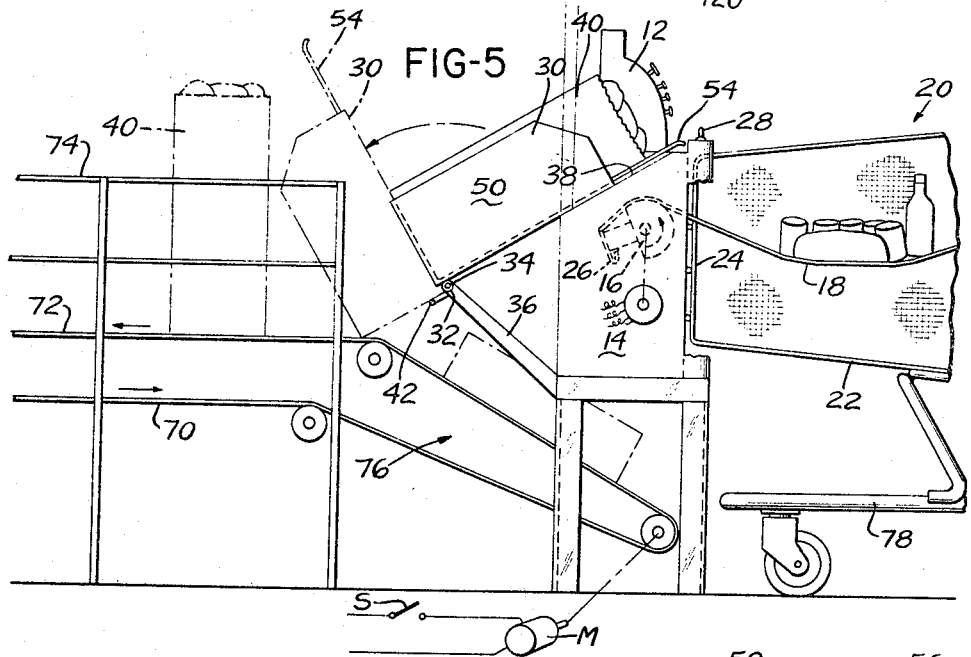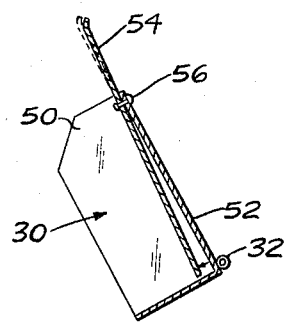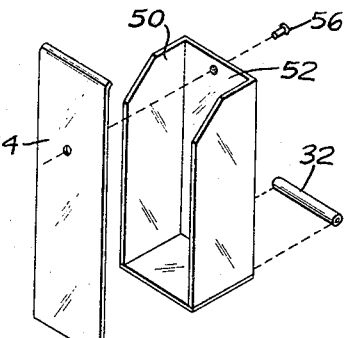

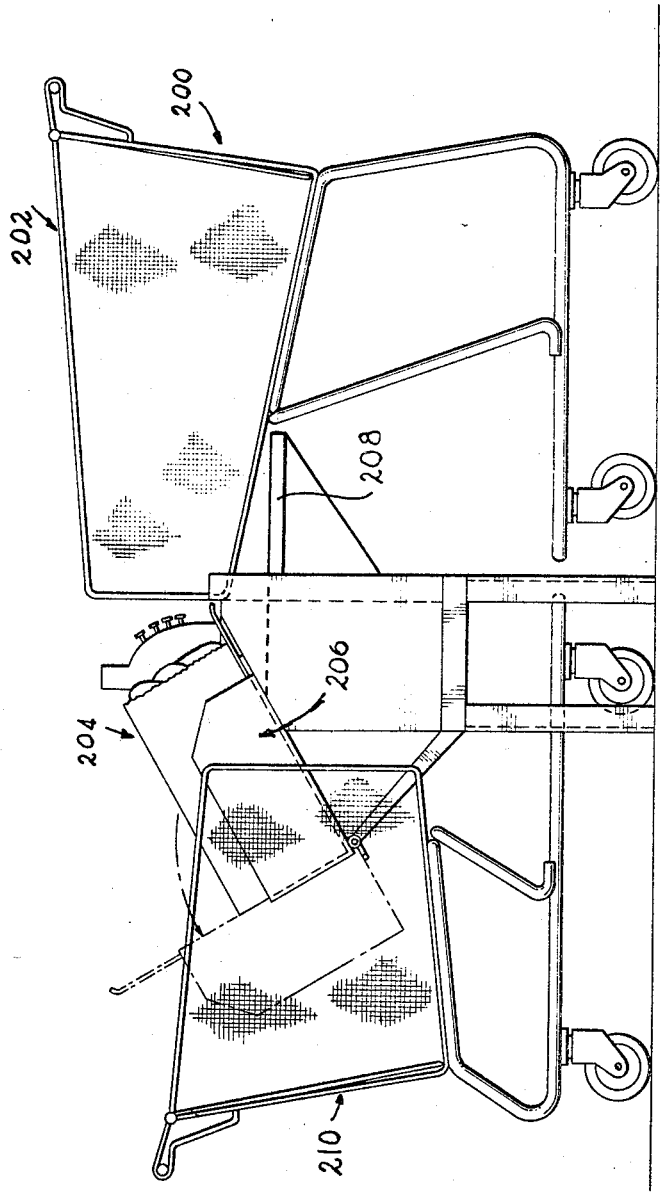

United States Patent Office 3,480,114
Patented Nov. 25, 1969

3,480,114
MERCHANDISE CHECK OUT SYSTEM
Willie M. Shoffner, 318 S. Lutheran Church Road,
R.R. 2, New Lebanon, Ohio 45345
Filed Aug. 11, 1967, Ser. No. 660,088
Int. Cl. A47g 9/02; B65g 67/00
U.S. Cl. 186—1                10 Claims

ABSTRACT OF THE DISCLOSURE

System for checking out merchandise in which tiltable holders for bags are mounted on a check out counter and are tiltable to discharge loaded bags together with a self-unloading cart, or a high-level cart.

---

This invention relates to a method and apparatus for checking out merchandise at a check out counter, and particularly in connection with a retail establishment such as a grocery store or the like.

In retail establishments of the nature referred to, the customer collects the articles of merchandise in a cart which the customer takes to a check out counter where a clerk adds up the total cost of the purchase and the articles are packaged so they can be removed from the establishment by the customer.

In my related applications and patents referred to, there is shown a merchandise cart arrangement of a substantially conventional type, except that a flexible belt-like member extends downwardly inside the front wall of the cart and backwardly along the top of the bottom wall, and is swivelly connected to the inwardly swingable back wall of the cart near the bottom thereof.

The check out counter is provided with a driven reel engageable with the leading end of the belt so that rotation of the reel under the control of the check out clerk will cause the merchandise to be lifted in the cart to within easy reach of the check out clerk, thereby relieving the customer of the necessity of unloading the cart on a counter as is the usual practice in such merchandise outlets.

The problem of packaging the articles after they have been picked up by the check out clerk and checked out by entering the purchase price on the cash register has become, and has always remained, a troublesome problem, and which required the presence of one or more additional clerks for packaging the articles for the customer. Such additional clerks represent an added expense and it is difficult to keep them busy at all times.

The present invention has as its primary object the provision of a method and apparatus for checking out mechandise in which a single check out clerk carries out the entire operations of unloading the mechandise cart, checking out the purchased articles by entering the purchase price thereof in the cash register, and packaging the purchased articles in bags ready for being transported away from the check out station by the customer.

A further object of the present invention is to provide a method and apparatus as referred to above in a relatively small space with all parts thereof conveniently located for the check out clerk.

A still further object of the present invention is the provision of a method and apparatus of the nature referred to in which the check out clerk does not need to leave the check out station at any time.

These and other objects and advantages of the invention will become more clearly understood in connection with the following description and drawings, in which:

FIGURE 1 is a perspective view showing a check out station arranged according to the present invention.

FIGURE 2 is a perspective view similar to FIGURE 1.

FIGURE 3 is a perspective view similar to FIGURES 1 and 2 but showing a conveyor for removing packaged articles from the check out counter.

FIGURE 4 is a somewhat schematic sectional view showing the arrangement of FIGURE 3, with a conveyor extending through a wall of the building so that the packaged goods are carried outside the building to a loading station.

FIGURE 5 is a somewhat schematic side view, partly in section, showing details of the arrangement.

FIGURE 6 is a vertical sectional view through a tiltable bag supporting device forming a part of the structure.

FIGURE 7 is a perspective view showing the bag supporting device of FIGURE 6.

FIGURE 8 is a view showing a modification.

Referring to the drawings somewhat more in detail, the check out arrangement shown in FIGURE 1 comprises a main counter structure 10 having space thereon for supporting a cash register 12. Adjacent the counter and within the range of the portion supporting the cash register is a power unit 14. As is illustrated more in detail in the said copending application, the power unit 14 is provided with a rotatable reel 16 (see FIGURE 5) adapted to engage a flexible belt-like member 18 which is swivelly connected at its rear end to a lower portion of the inwardly swingable back wall of merchandise cart 20.

The flexible element extends forwardly along the top of the bottom wall 22 of the cart and upwardly along the inside of front wall 24 thereof, and has a leading end 26 adapted for driving engagement with reel 16, as by magnet means or by hook means.

The check out clerk standing before the cash register 12 is enabled, as by a conveniently located switch 28, or by a foot switch, to cause reel 16 to rotate thereby to reel the flexible member in about the reel and thus lift articles in the cart to within easy reach of the check out clerk. The check out clerk can then pick up the articles one by one and enter the purchase price thereof on the cash register.

In my previous patents and applications, the check out clerk then placed the articles of merchandise on a counter or conveyor for packaging after the checking out operation or by a separate clerk. According to the present invention the articles are packaged by the check out clerk at the same time as they are checked out.

As will be seen in FIGURES 1 and 5, the packaging of the goods is accomplished by providing on power unit 14 the bag receiving members 30 which are open on the front and top. These bag receiving members, as will be seen in FIGURES 1, 5, 6 and 7, are provided with sleeves 32 secured thereto near the juncture of the back and bottom walls, which sleeves receive a pivot member 34 carried in a support 36 forming a part of power unit 14. The top of the power unit 14 is inclined, as at 38, and the support 36 with its pivot member 34 is so arranged that the bag receiving members 30 incline backwardly at an angle of about 60° when the bag receiving members are located in a position in which they are shown in FIGURES 1 and 5. With members 30 so arranged, bags 40 can be placed in the members with their open ends toward the check out clerk and articles can be transferred by the check out clerk directly from the cart into the bags.

FIGURE 1 shows how members 30 could be provided so that three bags could be arranged so as to be accessible to the check out clerk, whereas FIGURES 2 and 3 show only two bag supporting members.

When the bags and members 30 are to be discharged therefrom, the members 30 are tilted to their dot-dash position in FIGURE 5, and the bags will slide therefrom to a receiver. The members 30 are stopped in their outwardly tilted positions by a stop member 42 on support 36. The members 30 are at this time still within reach of the check out clerk so that after the bags slide from the members 30, the said members can be tilted back into position to receive another bag.

As will be seen in FIGURES 6 and 7, members 30 comprise a main frame part 50 open at the front and top and to which the sleeves 32 are attached. Extending downwardly immediately inside the back wall 52 of each member is a plate 54 which is loosely held on back wall 52 as by a long loose fitting rivet or bolt, or other connecting device 56.

The purpose of plate 54 is to push the loaded bag from the member 30 when the member is tilted to its unloading position, and furthermore, to provide a readily graspable element by means of which the check out clerk can tilt member 30. As will be seen in FIGURE 5, the extreme outer tip of member 54 is so positioned that it can readily be grasped by the check out clerk and the member tilted to its dot-dash position.

The weight of the loaded bag in member 30 will cause plate 54 to tilt to its FIGURE 6 position when member 30 is in unloading position, thereby to push the loaded bag at least part way out of member 30 so that it will slide to the receiver provided therefor.

In FIGURE 1 the receiver provided is an auxiliary cart 60 which is made in the same way as a conventional merchandise cart, except that it is somewhat shorter in the fore and aft directions and has an open front end 62. When unloading cart 60 is presented to the unloading side of the counter and when members 30 are tilted, the bags will slide directly into the cart. The bottom of cart 60 is preferably formed by wires 64 extending in the fore and aft directions and inclined to a greater degree than is encountered in conventional merchandise carts so that the bags can be readily moved to the back of cart 60 for transporting.

In FIGURES 1 and 2 the cart 60 forms the receiver that receives the loaded bags from the tiltable members 30, whereas in FIGURES 3, 4 and 5 there is provided a conveyor 70 leading from the discharge side of the check out counter. Conveyor 70 has an upper reach 72 to which the bags slide from the members 30 when the latter are tilted outwardly, and adjacent the conveyor there is preferably provided the containing guide rails 74.

As will be seen in FIGURES 4 and 5, the end of the conveyor adjacent the counter has a downwardly inclined portion 76 extending to beneath power unit 14. Downwardly extending portion 76 has its rearmost edge positioned adjacent the front of bottom shelf 78 of cart 20 so that articles resting on the bottom shelf can be pushed forwardly from the bottom shelf to the downwardly extending portion 76 of the conveyor whereupon the articles will be engaged by the conveyor and conveyed thereby up to the horizontal upper reach portion 72 thereof. The bottom shelf 78 of the check out cart is used for bulky items, such as sacks of potatoes and the like, and by the described arrangement the customer is relieved of handling even these bulky items at the check out station.

It is understood that the inclination of portion 76 of the conveyor is such that the articles transferred thereto will not slide on the conveyor but will be conveyed thereby.

A motor M may be provided for driving the conveyor and an energizing circuit including a switch S can be provided therefor, with the switch under the control of the check out clerk by means of any suitable sort of manual switch.

As will be seen in FIGURE 4, when a conveyor forms the receiver for the packages leaving the check out counter, the conveyor can extend through the building wall to a station outside the establishment so that the packages can be placed in the customer's car, either by the customer or by a clerk or employee stationed at the unloading platform.

In FIGURE 4 the check out counter is indicated at 80, the merchandise cart being unloaded is indicated at 82, the power unit is indicated at 84, the tiltable members for holding the bags are indicated at 86, and the conveyor is indicated at 88. The conveyor extends through opening 90 in the building wall 92. The opening can be made substantially weatherproof by providing a tunnel 94 in association with the opening, having one or more curtains 96 through which merchandise being conveyed by the conveyor passes.

Immediately outside wall 92 there may be an inclined ramp 98 down which the packages slide to a platform 100 from which they are either removed by the customer or by another clerk. Other arrangements for conveying the packages away from the check out counter can, of course, be employed, and FIGURE 4 merely illustrates one advantageous arrangement for accomplishing this.

For the convenience of the check out clerk counter 10 comprises a portion 110 extending backwardly adjacent the check out clerk's station and provided with means in the form of shelves for receiving sacks 112 which the check out clerk opens and places in the tiltable members 30 for a checking out operation.

In the arrangement of FIGURE 1, where three bags are employed, one of the bags may be utilized for crushable items such as bread or the like. It is also possible however, as shown in FIGURES 2 and 3, to provide a platform 120 supported vertically above power unit 14, for receiving such crushable items, or items such as ice cream or frozen goods, which are to be placed in special thermal bags or the like.

After the check out operation is completed, the check out clerk can readily effect the special bagging of such items and then deliver them to the receiver for loaded bags via one of the tilting members 30. By placing shelf 120 as shown it is convenient for both the check-out clerk and the customer.

It will be appreciated that the entire assembly is compact and thereby conserving of valuable space in a retail outlet as opposed to the usual check out arrangements which have long counters adjacent the check out clerk's station. It will also be appreciated that the customer does not need to handle any of the merchandise after it is brought to the check out counter. Rather the customer is free to observe the check out operation and to prepare for payment of the merchandise.

The unloading cart 60 is quite similar to the conventional merchandise carts and can readily be made with substantially the same equipment. Where the receiver is a conveyor this forms a relatively simple unit which can readily be installed.

The various orders checked out can readily be kept independent of each other by tagging the unloading carts or by tagging the respective orders when they are delivered to a conveyor.

The practice of the present invention materially speeds up the check out of orders, relieves the customer of all work in connection with the check out and permits the merchandise outlet to utilize a minimum number of employees and to utilize the employees in an efficient manner.

FIGURE 8 shows how a cart 200 can be constructed with a high level basket portion 202 which is at such a level that the contents thereof, collected and placed therein by the shopper, can easily be reached by the check-out clerk. The bottom of the cart slopes down toward the rear so the front of the cart can be left open as opposed to known carts which have a front wall. The rear wall of the cart is swingable inwardly so the carts can be nested for storage.

With such a cart, the merchandise can be transferred directly from the basket of the cart to the bags in the tiltable bag holders.

As will be seen in FIGURE 8, the cart is brought to a position adjacent the check out clerk which will position the basket so the clerk can pick up articles therefrom, move them through the open basket front, post the prices of the respective articles on the cash register, and then place the articles directly into the bags.

In FIGURE 8, the bags bear numeral 204 and the tiltable support structure therefor is designated 206.

Merchandise on the lower deck of the cart can be pushed therefrom to a conveyor or the like, or directly to the lower deck of the carry out cart 210, or lifted therefrom by the check-out clerk.

The height of basket 202 is such that the check out station can include a counter portion 208 below the bottom of the basket 202, if desired.

The device in which the bags are tiltably supported for being discharged to a conveyor or cart is the same for all of the modifications illustrated.

It will be understood that this invention is susceptible to modification in order to adapt it to different usages and conditions and, accordingly, it is desired to comprehend such modifications.

What is claimed is:

1. A check out counter particularly adapted for use in a retail merchandise outlet and comprising: a stationary frame adapted to be disposed adjacent a cash register counter and having a merchandise cart receiving station on one side to which a merchandise cart having a basket portion can be presented, a cart when positioned in said cart receiving station being adjacent a merchandise check out clerk standing in front of a cash register on said cash register counter, bag supporting devices mounted on the side of the counter opposite the side to which a merchandise cart is presented and adapted for supporting bags inclined with the open end thereof toward the check out clerk, and horizontal transverse pivot means pivotally connecting said devices to said counter for tilting of the devices in a direction away from said check out clerk, said devices being completely open on the side facing away from the check out clerk, first stop means engageable with said devices to stop and support said devices in a tilted position when tilted toward the counter, and second stop means engageable with said devices to stop and support said devices when tilted away from the counter, said devices when tilted away from said counter to stopped position being inclined at such an angle that bags therein will slide therefrom by gravity.

2. A check out counter according to claim 1, in which said check out counter includes a selectively rotatable reel in the frame thereof adjacent the side to which a merchandise cart is presented, said counter thereby being adapted for use with a merchandise cart of the type having a wheeled frame with a lower deck and an upper basket portion, said basket portion having an inwardly swingable back wall and a flexible belt-like element connected at its rear end to the back wall near the bottom thereof and extending forwardly along the top of the bottom wall of the basket portion to the front wall thereof and upwardly along the inside of said front wall and having engageable means on the front end projecting forwardly from said front wall near the top thereof, said engageable means being adapted for engagement by said reel to draw the element from the cart and thereby elevate articles in the cart to within easy reach of the check out clerk.

3. A check out counter according to claim 2 in which the side of said check out counter opposite said merchandise cart receiving station is inclined downwardly in a direction away from said check out clerk and said devices rest on the said inclined side of said check out counter when tilted toward the check out clerk, said inclined side of said counter forming said first stop means.

4. A check out counter according to claim 3, in which each said device comprises a box-like member having side walls and an end wall on the end remote from the check out clerk and a bottom wall on the side thereof that rests on the inclined side of the check out counter when the device is tilted toward the check out clerk and being open on the end facing the check out clerk and on the side opposite said bottom wall whereby a distended bag can be placed in the device for receiving articles of merchandise, said pivot means being located at the juncture of said end wall and said bottom wall.

5. A check out counter according to claim 4 in which each said device has an inner wall directly on the inside of the said bottom wall, said inner wall projecting beyond the end of said bottom wall at the top so as to be readily hand graspable by the check out clerk for tilting the device into bag discharging position, each said inner wall being loosely connected with said bottom wall near the top of the device so that when the device is tilted to bag discharging position, the said inner wall will tilt therein so the lower portion of said inner wall will push the bag in the device toward the open side thereof.

6. A check out counter according to claim 5, which includes an open front carry out cart adapted to be positioned on the opposite side of the counter from the merchandise cart from which articles are being checked out, said open sided carry out cart having a deck adapted to receive bags directly from said devices when the devices are tilted into unloading position.

7. A check out counter according to claim 5, which includes conveyor means leading from the check out counter and operable for receiving bags from said devices when the said devices are tilted into unloading position.

8. A check out counter according to claim 7, in which said conveyor inclines downwardly beneath said check out counter and terminates in front of the lower deck of a cart presented to the cart receiving station of the counter so that merchandise resting on the lower deck can be pushed forwardly therefrom to the conveyor and conveyed away from the check out station, said conveyor being spaced from the said devices when they are tilted into engagement with said first stop means.

9. A check out counter according to claim 8, in which said conveyor extends through a wall of the establishment for conveying the merchandise thereon to a point of removal on the outside of the establishment, and wherein airlock means are provided on said conveyor to prevent any substantial exchange of air between the inside and the outside of the establishment while permitting merchandise from the conveyor to pass through said wall to the said point of removal thereof.

10. A check out counter according to claim 1, in which said devices comprise a plurality of devices in side by side adjacent relation and individually tiltable between article receiving position in which the open ends of the bags therein are presented to the check out clerk and unloading position wherein the devices are tilted away from the check out clerk and the bags slide from the devices to a receiver.

References Cited

UNITED STATES PATENTS

| | | | |
|---|---|---|---|
| 1,050,267 | 1/1913 | Forth | 221—235 |
| 1,281,640 | 10/1918 | Noteman | 280—47.34 |
| 2,096,959 | 10/1937 | Clerc | 186—1 |
| 2,641,400 | 6/1953 | Simmons | 186—1 |
| 2,902,811 | 9/1959 | Joyce | 186—1 |
| 3,039,564 | 6/1962 | Shaukis | 186—1 |
| 3,140,758 | 7/1964 | Berg | 186—1 |
| 3,245,498 | 4/1966 | Stanley | 186—1 |
| 3,270,485 | 9/1966 | Knepper | 186—1 |
| 3,286,794 | 11/1966 | Shoffner | 186—1 |
| 3,297,108 | 1/1967 | Davis | 186—1 |
| 3,363,723 | 1/1968 | Cunningham | 186—1 |

EVON C. BLUNK, Primary Examiner

H. C. HORNSBY, Assistant Examiner

U.S. Cl. X.R.

53—189, 384; 280—33.99, 47.34